United States Patent [19]
Reid

[11] Patent Number: 5,069,715
[45] Date of Patent: Dec. 3, 1991

[54] DIRECT SMELTING PROCESS AND APPARATUS

[75] Inventor: Kenneth J. Reid, Edina, Minn.

[73] Assignee: Regents of the University of Minnesota, Minneapolis, Minn.

[21] Appl. No.: 503,280

[22] Filed: Apr. 2, 1990

[51] Int. Cl.$^5$ ............................................. C21B 11/08
[52] U.S. Cl. ......................................... 75/414; 75/500; 75/501; 266/144; 266/162; 266/186; 266/160
[58] Field of Search ................... 75/500, 501, 502; 266/144, 160, 161, 162, 171, 186

[56] References Cited

U.S. PATENT DOCUMENTS

| | | | |
|---|---|---|---|
| 2,557,650 | 6/1951 | Gilliland | 75/500 |
| 2,557,651 | 6/1951 | Gilliland . | |
| 2,612,444 | 9/1952 | Rummel | 75/500 |
| 3,326,671 | 6/1967 | Worner | 75/502 |
| 3,463,472 | 8/1969 | Worner . | |
| 3,932,173 | 1/1976 | Collin et al. | 75/10.15 |
| 4,187,672 | 2/1980 | Rasor | 266/162 |
| 4,701,217 | 10/1987 | Warner | 75/500 |

FOREIGN PATENT DOCUMENTS

| | | | |
|---|---|---|---|
| 0266975 | 5/1988 | European Pat. Off. . | |
| 668242 | 10/1929 | France . | |
| 1046675 | 10/1966 | United Kingdom | 75/501 |

OTHER PUBLICATIONS

N. A. Warner, Coal Based Ironmaking Via Melt Circulations, in Metallurgical Processes for the Year 2000 and Beyond, The Minerals, Metals & Materials Society, 1988, pp. 669-719.

Innes, J. A. et al., (Direct Smelting of Iron Ore in a Liquid Iron Bath—The HISmelt Process), 1988 *Process Technology Conference Proceedings*, pp. 225–231.

Primary Examiner—Melvyn J. Andrews
Attorney, Agent, or Firm—Kinney & Lange

[57] ABSTRACT

The present invention relates to an overall direct smelting process which provides for separating the carburization function from the heating function to permit separate control of the individual functions. One embodiment of the smelting reactor is divided into a carburization/smelting section and a heating section with a substantial recirculation of the molten product from the heating section back to the carburization/smelting section. The heating section also serves as a slag/metal separation section. Carburization is achieved by injection of solids (fine coal mixed with slagging agents), where desired. Gas generating solids or inert gases are injected into a lift pipe to provide a motive force for circulation of the molten metal. The circulation rate through the system is a function of the injected solid composition, the mass flow rate of the solids injected into the lift pipe and the lift pipe geometry. The liquid is discharged from the carburization/smelting chamber into a heating chamber where the pressure is preferably lower than in the carburization/smelting chamber, and where submerged combustion occurs in the slag. Weirs are provided for slag removal and discharge of the finished metal and a recirculation passageway or tube is provided to feed a substantial portion of the heated metal back into the carburization/smelting chamber. A compact high efficiency direct smelting process is thus achieved.

22 Claims, 4 Drawing Sheets

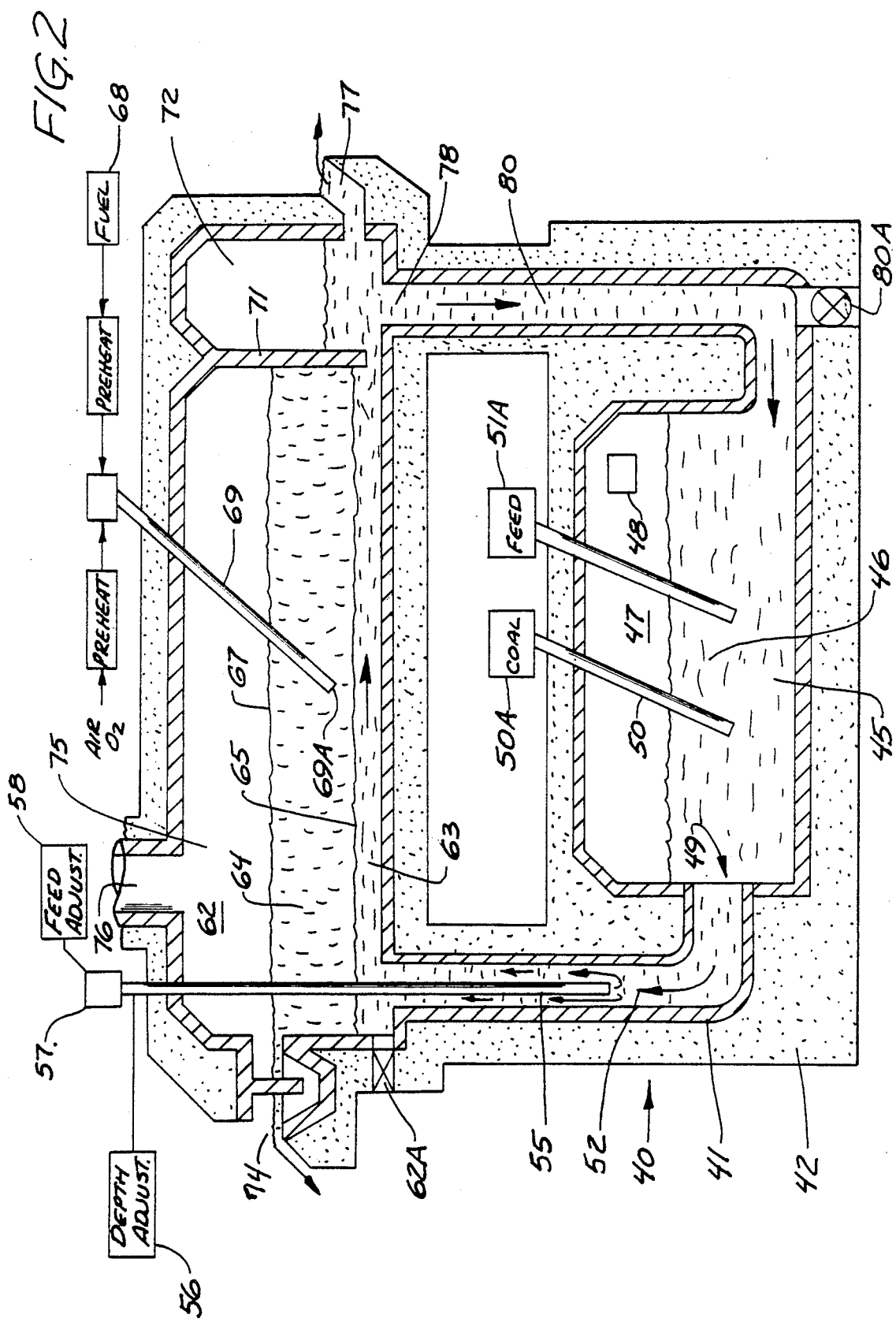

DIRECT SMELTING PROCESS AND APPARATUS

BACKGROUND OF THE INVENTION

The present invention relates to a highly efficient compact smelting system which uses fine coal as the source of process energy and as the source of carbon for molten metal carburization. The motive force for circulation of liquid metal through separated treatment chambers is provided by the coal or the injection of gases or other gas generating solids. Provision is made for separation of the three key process functions of smelting reduction, melt carburization, and heating to permit optimal process configurations for site specific applications.

An integrated metallurgical reactor is described in my co-pending application, Ser. No. 07/400,566, filed Aug. 30, 1989. The integrated metallurgical reactor utilizes a central carburization chamber and a channel that circumferentially surrounds this chamber and provides locations for continued smelting, and refining in a very compact arrangement. As part of the device, the concept was introduced of injecting coal into a riser channel that was the lower portion of the combustion-carburizing chamber to provide an uplift action which not only injected coal fines for carburization but provided uplift energy for recirculating molten materials from the smelting channel back into the carburizing chamber. The functions of carburizing, and smelting reducing, and refining were separated and the off gases could be separately controlled, but the heating and carburizing were combined in a single chamber. The compact smelting reactor shown therein provided many advantages over existing devices. The present invention represents an improved process for a further separation of heating and carburization functions and for even more efficient use of input energy.

Also, the prior art discussed in my aboveidentified application outlined the state of the art in smelting technology. One recent approach to direct smelting processes is shown in U.S. Pat. No. 4,701,217, issued Oct. 20, 1987, where two large furnaces of a geometric configuration similar to those employed in nonferrous reverberatory furnace practice are operated side by side. One of the furnaces is used for processing lump coal and the combustible gases produced by the volatilization of the lump coal flow into the second furnace where smelting and heating take place. In the second furnace carbon monoxide gases generated by high temperature smelting reduction of iron oxide feedstocks combine with the coal volatiles and flow to the combustion section of the furnace where the mixture is combusted with preheated air and/or oxygen introduced through overhead lances in a manner similar to that employed in reverberatory furnace practice. This device utilizes two large furnaces, and achieves a high degree of heat transfer from the combustion gases to the metal by providing for a large clean metal surface. However, this requires a correspondingly large furnace hearth area and to avoid hearth refractory problems the flowing metal is supported on a large pool of molten lead. The presence of such a large reservoir of molten lead at a temperature in excess of 1300° C. poses serious potential environmental problems. The side-by-side placement of the furnaces consumes a substantial amount of space, and leads to inefficiencies in the transfer of materials into the various stages in the two furnaces and high heat losses from the large surface area of the system.

Another approach, shown in a paper presented by Innes et al. at the Iron & Steel Society meeting, Toronto, April 1988, is based on the "in-bath" principle in which coal and iron ore feed materials are injected into a molten metal bath. The off gases are combusted above the melt by air or oxygen introduced through a post combustion lance and a portion of the heat of combustion is transferred back into the molten metal. A single vessel is thus employed for coal processing, ore smelting and heating. This system is known as the HIsmelt process.

The overall process efficiency in the prior art depends on the degree of post combustion and the heat transfer efficiency from the combustion gases to the melt. An inherent inefficiency of these systems is the inability to prevent some contact between oxidizing gases such as oxygen or carbon dioxide and the molten metal. By this mechanism, carbon in the melt is oxidized to carbon monoxide and the degree of post combustion is reduced.

As a result of the various limitations discussed above, these processes are likely to find only limited industrial application. However, the present invention relies on process optimization by the clear separation of the fundamental process functions and permits a range of engineering solutions and operating strategies. For instance, in one case it may be desirable to combine carburization and heating as in my earlier disclosure. Alternatively, it may be desirable to combine the smelting and carburization as described hereinafter. Finally, it may be preferred to keep all of the functions separate, for example when separate use of the process gases may be advantageous.

SUMMARY OF THE INVENTION

The present invention relates to a basic direct smelting process that permits separating the functions involved in the smelting of ores, and in particular separating the carburization function from the post combustion and heat transfer function. Only such separation permits separate control of the degree of post combustion, independent maximization of the heat transfer, and the ability to minimize inefficiencies that occur from direct contact of carbon dioxide in the final combustion off gases with the carburized hot liquid or molten metal.

The direct smelting process is carried out in a reactor with at least two chambers. One is a carburization/smelting chamber at a lower portion of the reactor in which coal fines and ore fines are injected into liquid metal (iron). The other is a heating chamber generally at a higher level than the carburization/smelting chamber. At least one of the injection lances is provided in a lift inducing conduit or pipe to provide a motive force for circulation of the molten metal. The carburization/smelting chamber may be at an elevated pressure to maintain a difference between the level of the liquid in the carburization/smelting chamber and the level of the liquid in the heating chamber. Although it may appear possible at first examination to use the pressure differential between the two vessels as an energy source for circulation of the molten metal, on closer examination this is not possible and some form of motive force is required. The injection of coal or ore into the lift pipe connecting the carburization chamber to the heating chamber forms gases which provide energy so that liquid metal circulation in the system is maintained as a function of the rate of injection, and the geometry of the lift pipe or channel. Direct injection of inert gases or $CO_2$, or other metal pumping methods may also be employed to provide the circulation motive force if desired. Slagging agents may be injected with the coal and ore to form a slag with desired physical and chemical properties. Slag so formed will flow with the circulating metal through the lift pipe column connecting the carburization/smelting chamber to the heating chamber, where the slag will rise to the top of the liquid metal and join the slag layer. The pressure in the heating chamber may be lower than in the carburization/smelting chamber, and a substantial depth of slag is maintained on the top of the liquid molten metal in the heating chamber. The slag serves as an efficient heat transfer medium for heating the metal. Excess slag is removed at a sufficient desired height through a suitable weir or may be removed intermittently through a conventional slag tap hole.

Heating is achieved by submerged combustion of fuel gases within the slag layer at a desired level below the surface of the slag, but at a sufficient height above the slag/metal interface, so that there is no contact of the combusted gases with the molten metal. Post combustion inefficiencies suffered by other in-bath direct smelting processes due to the reaction of carbon dioxide or oxygen with the carbon in the molten metal are thus avoided. The slag is discharged at a desired level through a suitable weir that maintains a gas seal in the heating chamber, and the heated metal exits the heating chamber through a down pipe to flow into the carburization/smelting chamber.

A carburized liquid metal product is removed via submerged discharge ports and overflow weirs at an appropriate location in the heating chamber. Further refining of the liquid metal removed from the heating chamber can be carried out as desired including the method of desulphurizing and decarburizing in an annular channel as described in copending U.S. application Ser. No. 07/400,566.

If separate use of the carbon monoxide formed in the smelting reactions and the hydrogen plus carbon monoxide formed in the carburization reactions is required, then the smelting and carburization can be accomplished in separate chambers.

In the arrangement as described, fine feed materials and coal, plus any required fluxing agents are fed or injected into the hot liquid metal as it flows through the carburization/smelting chamber. The carburization/smelting chamber is connected to a lift pipe or channel connected to the heating chamber. The liquid metal is moved through the lift pipe or channel into the heating chamber for recirculation and heating.

If required, separate chambers can be provided for smelting and carburization thereby permitting separate management of the off gas streams.

The process can be practiced with a wide range of coals. The carburization process relies on the fixed carbon content of the coal and a minimum coal mass is required to meet this condition. The gases released are used for heating either alone or in combination with the carbon monoxide generated by the in-bath smelting of the iron ore feedstocks. If the fixed carbon content is high and the total gaseous product is insufficient to provide the required heat input, the balance can be achieved by injecting oxygen into the carburization zone to convert a portion of the carbon into carbon monoxide. This releases energy into the bath due to the heat of reaction between carbon and oxygen to provide carbon monoxide and also provides additional carbon monoxide in the gas phase for subsequent combustion. Alternatively, for coal with a low fixed carbon content, there will be an excess of energy content in the gas stream. This can be accommodated by exporting gas or by using the gas for heating and melting scrap fed into the heating chamber.

Due to the total enclosure and compact nature of the process, it is particularly attractive from an environmental point of view. An additional environmental advantage is the use of fine feed materials which permits totally enclosed material handling systems based on dense phase pneumatic transport principles. The total volume of gas involved in the process is substantially less than that involved in current coke oven/blast furnace practice and is yet another environment advantage. Also, due to the high degree of combustion in the heating chamber, final gases are substantially comprised of carbon dioxide and water (plus any nitrogen introduced in combustion air) and lend themselves well to conventional gas cleaning.

BRIEF DESCRIPTION OF THE DRAWINGS

FIG. 2 is a schematic vertical sectional view through a smelting reactor suitable for performing the direct smelting process of the present invention to illustrate schematically the functions of the reactor;

DETAILED DESCRIPTION OF THE PREFERRED EMBODIMENTS

Figure 1:
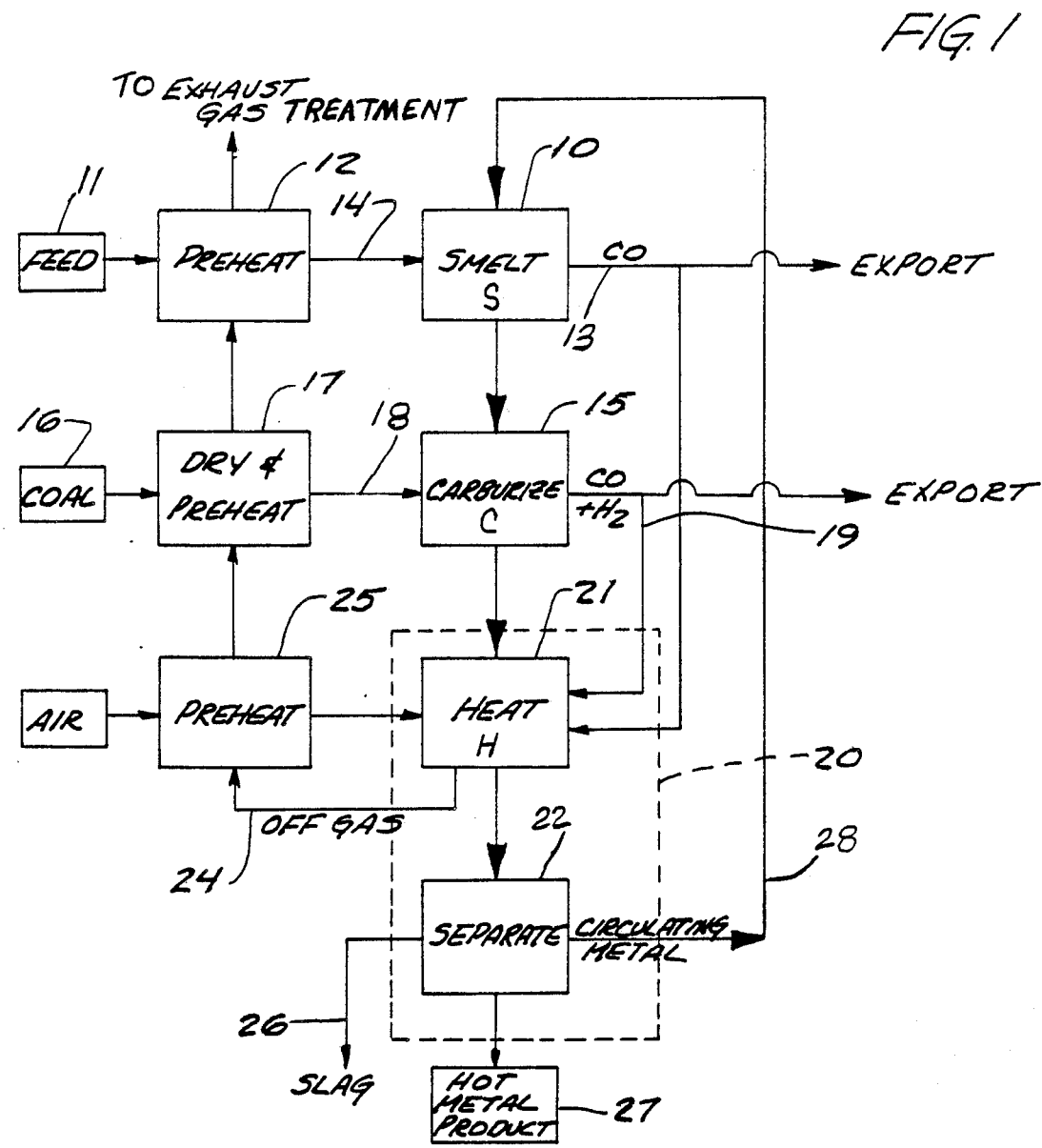
FIG. 1 is a block diagram-flow chart showing the material flow and operational functions of the direct smelting process which is the subject of the present invention.

FIG. 1 is a general flow sheet of the direct smelting process of this invention which provides a graphic display of the different reactions or functions, and the interrelation of such functions as will be described. For clarity, FIG. 1 shows the case where separate smelting and carburization chambers are employed since this gives the clearest indication of the separate functions involved. The forms of the invention in the rest of the figures show smelting/carburization in the same chamber. The smelting chamber is indicated at 10, and a feedstock source is indicated at 11. Additionally, the feedstock can be preheated through preheat chamber 12 before being added to the smelting chamber. Exhaust gases from the preheat chamber can be discharged to conventional off gas treatment as shown. The feedstock is fed through a lance 14 to the smelting chamber 10. The carbon monoxide that is formed in the smelt chamber can be discharged through a conduit 13 and used for heating or for external purposes including prereduction of the feed, if desired.

A carburizing chamber is indicated at 15, and includes coal (carbon) source 16, a preheating and drying chamber 17, if desired, for the coal source, and injection lances 18, one of which may be used for providing a motive force for a gas driven lift pipe used to transfer materials between chambers, as will be explained. The process gases from the carburizing chamber 15 comprising essentially carbon monoxide and hydrogen are discharged through conduit 19 and may be used to heat the molten metal in the reactor or for external purposes, including prereduction of the feed.

A metal heating chamber, as indicated by dotted lines 20, has two portions, including the heating portion 21, and a portion for the separation of slag and metal indicated at 22. The off gases from the heating chamber can be provided as shown at 24 to a preheating chamber 25, and used for heating the air for combustion.

Gases in the conduits or tube connections 13 and 19 are delivered to the heating chamber 20 and used as fuel for heating. In a separation function, slag is formed on the top of the metal and is discharged out through a weir discharge indicated at 26. Hot metal product is discharged through a submerged port as desired and as indicated at 27. The liquid metal recirculation is represented at 28 and this recirculation then goes back into the smelting chamber 10.

FIG. 1 thus provides for a graphic display of the separation of the various functions or chambers and how the process permits control of the off gases, eliminates the disadvantages of having carbon dioxide off gas from the heating function contacting the metal, and permits optimization of the energy requirement of the process.

The gases in the three chambers are separated or isolated from each other for separate control. Various combinations of the three essential process steps of smelting (S), carburization (C), and heating (H) may be employed to suit particular process objectives. For instance, combination of all three functions in one vessel (S+C+H) is attempted in the HIsmelt process and in most of the other in-bath smelting systems found in the literature. The combination of smelting and heating (S+C) may be carried out in a single reverberatory furnace as in the system proposed by Warner, while the combination of carburization and heating (C+H) may be achieved in the process disclosed in my earlier application. The present invention shows the process advantages where heating is separated while the smelting and carburization (S+C) may be carried out together or where there is total separation of the three functions permitting separate control and utilization of the process gases.

Figure 3:
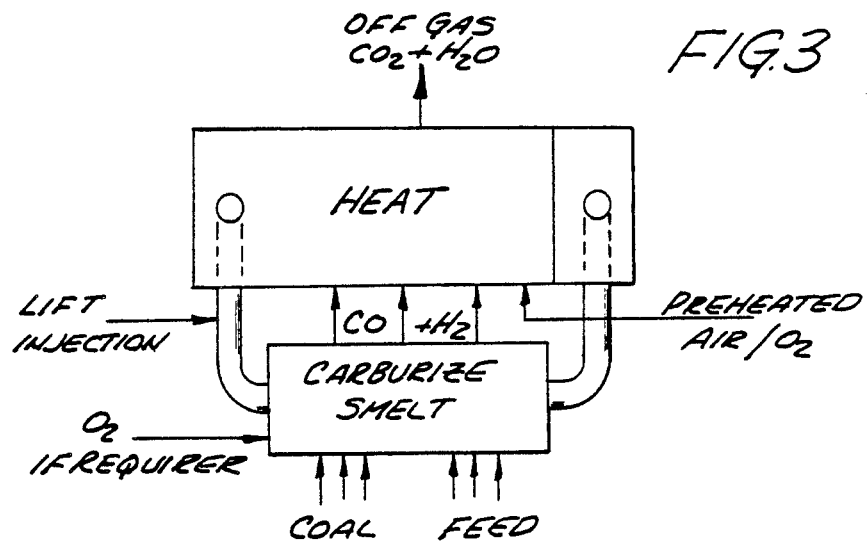
FIG. 3 is a schematic representation of a top view of the reactor of FIG. 2.

In the embodiment of FIGS. 2 and 3, a smelting reactor illustrated generally at 40 is made as a housing of different sections having walls to provide for individual passageways and chambers. These passageways or conduits and chambers generally are made of a construction that includes a high quality refractory lining 41 with insulation backing 42. Alternatively known skulled lining practice may be used if desired, particularly in areas subjected to high corrosive or erosive wear.

Smelting reactor 40 maintains separation of the carburizing and smelting functions from the heating function, thereby avoiding the post combustion inefficiencies due to contact of oxidizing gas species with the metal as described above.

As shown, a carburization/smelting chamber indicated generally at 45 includes a pool of molten or liquid metal 46, and an upper chamber portion 47 that contains gases, called process gases. A process gas flue or pipe is shown only schematically in end view at 48 for carrying the process gases for internal or external use. The process gases are primarily carbon monoxide and hydrogen. The molten metal pool level is established by regulating the pressures in the system. The process gas outlet 48 can be valved or throttled as desired to control the off gas pressure and maintain the pressure in the gaseous portion 47 at a desired level. Carburization is carried out by injecting fine coal mixed with slagging agents into the hot, liquid metal 46.

Figure 4:
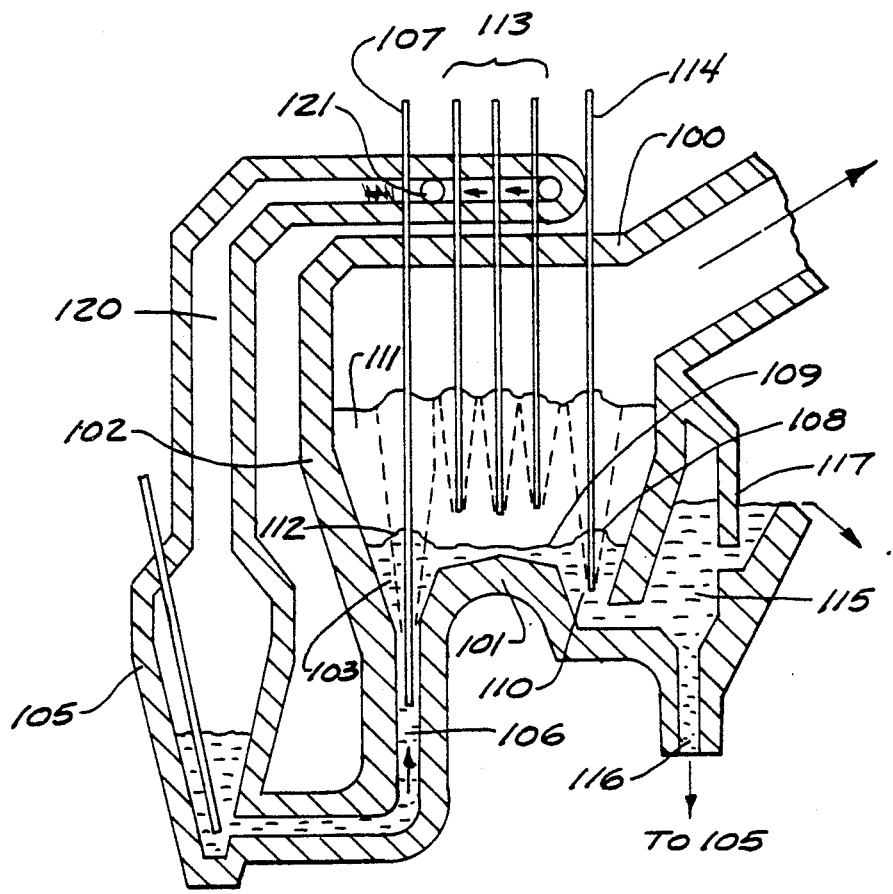
FIG. 4 illustrates schematically a cross section of an alternative arrangement for the heating chamber of the present invention.

Smelting is carried out by injecting fine feed material mixed with slagging agents into the hot liquid metal 46 where reduction by contact with the carbon in the liquid metal pool takes place. The heat of reaction for both coal devolatilization and reduction of feed is provided by the thermal mass of the circulating liquid metal. The injection of coal and feed material is carried out in a selected number of lances distributed along the length of the carburization/smelting chamber in order to optimize the process performance. It is also possible to use a cylindrical vessel in a configuration similar to the basic oxygen furnace geometry if desired, as illustrated in FIG. 4. The degree of turbulence in the carburization/smelting chamber 45 is such that the slag generated from the various injected materials is maintained in suspension in the liquid or molten metal pool 46, and in a lift tube 52, which carries the suspension flow to a heating chamber 62. A coal injection lance indicated at 50 is provided with a variable feed coal source 50A to inject a portion of the coal fines into the metal pool 46 of the main chamber 45. The depth of submersion of the end of the injection lance 50 can be controlled as desired.

A selected number of such injection lances or injection systems is provided so that the coal injection sites are spaced along the length of the channel to permit overall process optimization with respect to the gas and solids loading capacity of the injection zones. In a similar manner a lance 51 and feed control 51A are used to inject the feed material into the liquid metal 46.

The lift pipe or conduit section indicated at 52, is a generally vertical passageway which connects the carburization/smelting chamber 45 to the heating chamber 62. The lift tube or conduit 52 carries molten or liquid metal into which a lance 55 is placed at a desired depth through an insertion adjustment device 56. The lance is connected to a fine solid source 57 that has an adjustable feed device 58 controlling it, so that the amount of solids being injected can be controlled, and the depth of insertion of the lance into the lift tube 52 also can be controlled. The solids injected are selected to provide a lift pump action and can be either coal or ore with slagging agents blended as desired. The injection of the solids and slagging agents from the source 57, through the lance 55 causes gasification and the gases provide a bubbling, turbulent action which provides a motive force for circulation of the liquid or molten metal throughout the system. The liquid metal circulation rate is a function of the injected solids composition, the mass flow rate of solids injected into the lift tube or conduit, the geometry of the lift tube and the depth of injection. With a vertical lift tube 52 maintained at its desired position as shown in FIG. 2, and for a given solids composition, without changing the other parameters, the circulation flow rate of the liquid or molten metal in the system can be adjusted by changes in the quantity of solids injected by varying the feed rate adjustment device 58, or by varying the depth of injection of the solids (coal) by lifting or lowering the lance through the use of the adjustment device 56, or a combination of both.

Alternatively, the motive force for circulating the molten metal can be provided by the injection of inert gases, carbon monoxide or carbon dioxide. Any other pumping method usable for liquid metal may also be used, but the gas lift is preferred for its advantages.

The degree of agitation of the liquid metal in the carburizing chamber metal pool 46 is such that there is high degree of mixing, and the slag generated from the solids introduced through lance 50 or 51, for example, is maintained in suspension throughout the liquid or molten mass of metal in the liquid metal pool 46 in chamber 45, which may be a channel of substantial length or circular in section.

The chamber 45, and the gaseous portion 47, becomes pressurized while the liquid portion comprises a turbulent, agitated mass of hot liquid or molten metal and slag in suspension. Molten metal is driven by the lift pump action described above and the circulating metal moves through the lift tube 52 into the heating chamber 62, which is at a lower pressure than the carburization/smelting chamber 45.

In the event that slag separation occurs in chamber 45 and a slag layer builds up in chamber 45, the slag layer can be periodically removed by increasing the pressure in the gas section 47 until slag discharges through opening 49 at the exit of chamber 45 connecting to the lift pipe 52.

The heating chamber 62 contains a layer of liquid or molten metal 63 at the bottom. Because the agitation is reduced, slag separates from the melt and joins a thick layer of slag 64 on top of the molten metal. The level of the slag/metal interface indicated at 65 can be controlled by the pressure difference between chambers 47 and 62, and the depth of the slag layer 64 will vary accordingly. The slag layer serves as an efficient heat transfer medium for heating the liquid metal layer 63.

In the present invention, heating is preferably achieved by submerged combustion of fuel gases within the slag layer at a desired level below the upper surface 67 of the slag. However, the submerged combustion must be at a sufficient height above the slag/metal interface 65 so that there is no contact of the combusted gases with the molten metal. As shown the fuel and oxidant are introduced separately into the combustion lance 99 which has a lower end 69A submerged below the upper surface 67 of the slag and above the interface 65 at a desired level. Injected combustion gases exiting lance 69 will provide heat to the slag layer, which in turn transfers the heat to the molten metal and maintains the molten metal pool 63 at the desired temperature.

The submerged combustion provides for excellent heat transfer from the combustion gases to the slag and also induces a high degree of mixing in the slag because of the agitation caused by the combusting gases rising through the slag. This aids in the heat transfer from the slag to the liquid or molten metal.

Figure 6:
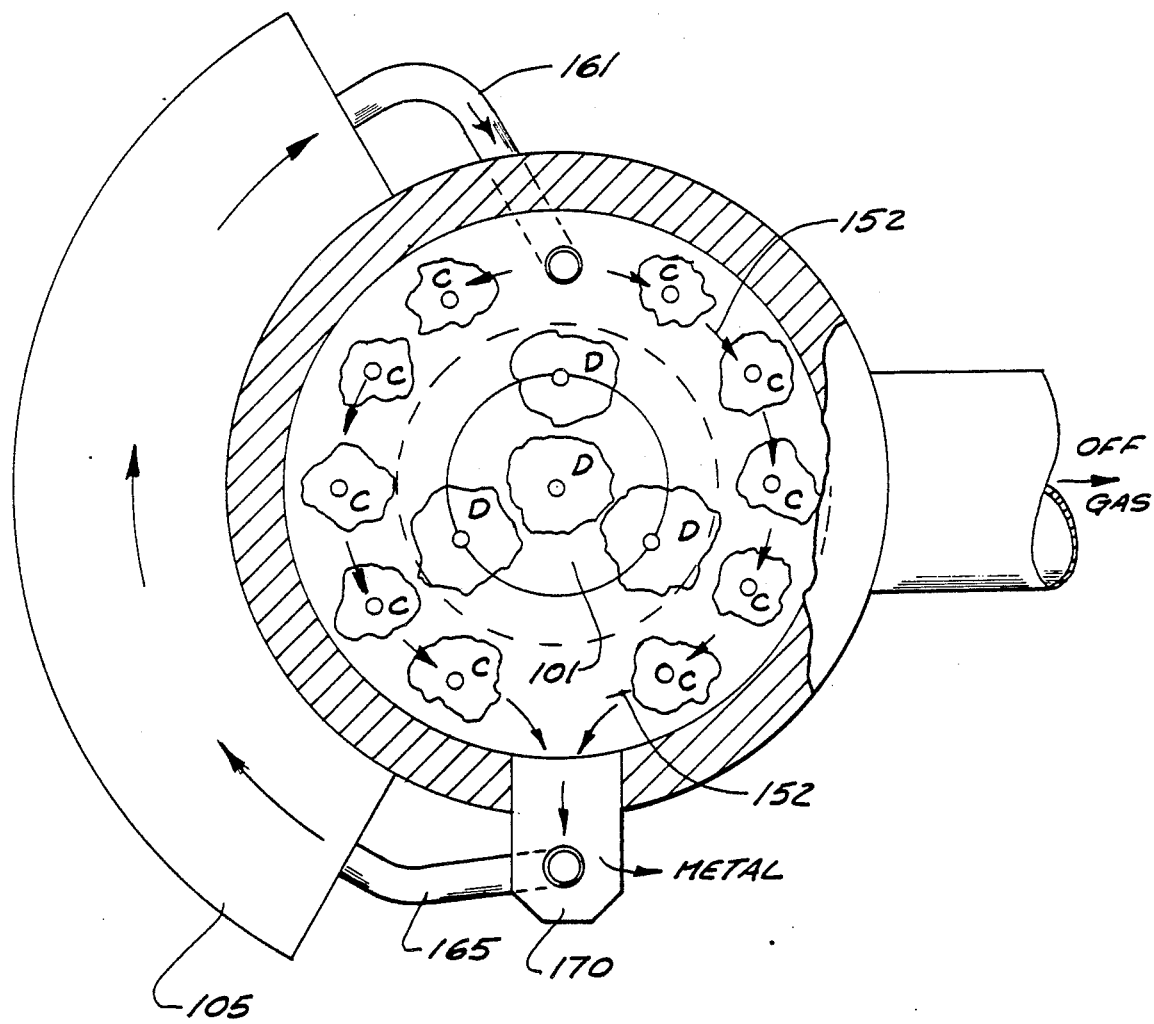
FIG. 6 is a schematic representation of a horizontal cross section of a form of the invention, similar to FIG. 4.

Increased heat transfer at the slag/metal interface 65 may be achieved, if desired, by forced circulation of the liquid metal with gas injection into the metal pool or layer 63, or by selected geometries for the heating chamber floor to increase interfacial velocity and turbulence. A channel section with gas injection, as shown in FIG. 6 may also be employed for achieving improved heat transfer between the molten slag 64 and liquid metal 63. A typical overflow/underflow/overflow slag discharge weir system, as indicated at 74, is provided to maintain the slag layer at level 67 and also to maintain a gas seal for the heating chamber 62. The heating chamber 62 also includes an upper portion 75 that contains combusted gases, and an off gas flue 76 is provided for taking the off gases (carbon dioxide and water vapor generally) for preheating various feed streams. Also, a drain, shown schematically at 62A, can be provided to permit draining the heating chamber 62 for service while drain 80A permits drainage of the smelting/carburization chamber 45. The circulating metal exits the heating chamber 62 by flowing under slag dam 71 into down flow chamber 72.

A small portion of the circulating mass of liquid metal is removed through a suitable underflow port and discharge weir such as that shown at 77, near an exit port 78 connected by recirculation channel 80 to the carburization/smelting chamber 45.

Operation of the submerged combustion lances at a level sufficiently above the slag/metal interface 65 and below the surface 67 of the slag reduces the postcombustion inefficiencies suffered by other in-bath direct smelting processes due to the reaction of carbon dioxide or oxygen with carbon in the metal pool in such other direct smelting processes. The contact of carbon dioxide with the liquid or molten metal pool 63 is avoided with the present system.

The fuel for submerged combustion can be provided from the hot pressurized gases generated in the smelting/carburization chamber 45, and thus the conduit or port 48 can be connected to the source 68.

The smelting reactor system shown provides for continuous circulation, with the desired amount of liquid metal recirculation controlled by adjusting the solids feed through the lance 55, the position of the lance 55, and the geometry of the pneumatic lift conduit or tube 52. The amount of heat added can be controlled by controlling the quantity of fuel supplied to the combustion chamber.

The overall cross section of the smelting reactor can be generally rectangular with the carburization/smelting chamber 45 forming an elongated rectangular channel or alternatively as mentioned above a basic oxygen furnace geometry with circular section may be employed. Likewise, the heating chamber can be a rectangular channel having a longitudinal length as shown in FIG. 3 or a converter shaped vessel as shown in FIG. 4. The connecting conduits would have selected cross-sectional sizes and are selected in number and location to accommodate the desired liquid metal flow.

The process can be operated so that the liquid metal (iron) entering the carburization/smelting chamber 45 will have a carbon content in the range of 0.5 percent to 3.5 percent.

The injection lances for adding solids for providing energy for circulation of the liquid metal also can be varied in location as desired, and can be either on the inlet conduit to the heating chamber as shown or at a different location. The conduit for injection of recirculation energy should be generally upright, with the liquid metal flow upward due to the lifting action of the rising gases.

FIG. 4 illustrates an alternative arrangement wherein a heating chamber indicated generally at 100 is made generally circular in horizontal cross section, and is similar to in-bath smelting vessels or converters. Its bottom has a central raised boss member 101 centered on the outer wall 102 forming an annular channel 103.

The smelting/carburizing chamber also can be part annular, and is indicated at 105. It is positioned below the heating chamber 100. The chamber 105 is pressurized as explained previously. A conduit or pipe indicated at 106 leading from the smelting/carburizing chamber to the heating chamber forms an inlet that connects into the annular channel 103. A lance 107 is positioned in this inlet conduit or tube 106 to provide pumping action by gas injection, either using coal fines as explained before or some other gasifying solid, or providing for direct gas injection. The pumping action provides movement of liquid metal from the smelting-/carburizing chamber to the heating chamber.

The pumped metal rises into the slag layer 111 and provides for greater agitation, and greater transfer of heat in a zone indicated at 112 immediately above the end of tube 106. Suitable injection lances 113 inject material for combustion in the slag, and gas injection lances 114 can be used for agitating the liquid metal in order to enhance heat transfer to the metal in zone 118 similar to zone 112

Hot metal from channel 110 can flow into a short channel section 115, and through a recirculation tube 116 back to the smelting/carburizing chamber 105 where suitable treatment can take place. A weir indicated at 117 can be used for removing metal, from the channel portion 115 as desired.

The depth of slag layer 111 above the molten metal is substantial, and the height of the metal interface level 109 is controlled so that the central boss 101 is always covered with metal. The smelting/carburizing chamber 105 is positioned below the heating chamber as shown, and has a suitable process gas flue 120 that leads to a process gas ring main 121 providing fuel to the submerged combustion lances 113. The process gas can also be taken from flue 120 for external uses, if desired.

If the smelting/carburizing chamber is a part annular channel, then the configuration shown generally in prior U.S. application Ser. No. 07/400,566 could be used to advantage. The slag level can be maintained by a suitable weir in a well known manner.

Figure 5:
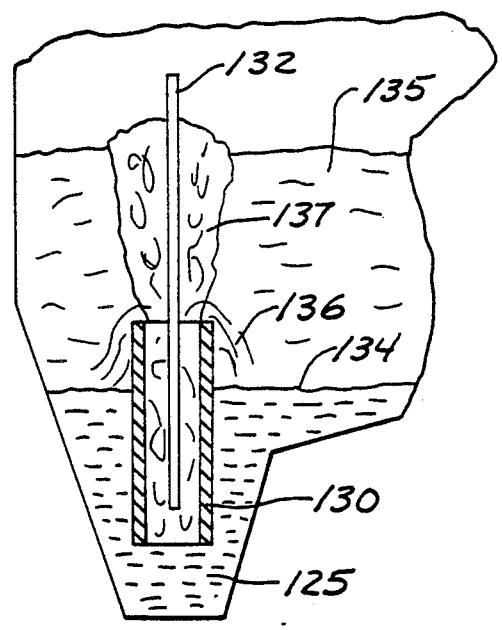
FIG. 5 is a schematic representation of a lift tube which improves the heat transfer from the slag to metal in the heating chamber.

The structure shown in FIG. 4 shows that a variety of geometries for carburizing/smelting channels can be selected to perform the requirement of connecting the recirculating tube 116 from the heating chamber to the smelting/carburizing chamber. Also, the use of an inlet tube 106 entering into the annular channel 103 provides for turbulent interaction between the rising metal and the slag thereby greatly enhancing heat transfer between the two liquids. Further enhancement of the metal/slag heat transfer can be achieved if desired by providing a lift tube for the metal mixing gas injection as shown in FIG. 5. A lift tube 130 is mounted in channel 125 and a lance 132 is provided with gas forming solids, or gases, to generate lift. The upper end of the lift tube 130 is above the interface level 134 between the slag layer 135 and the molten metal contained in the channel 125. The gas from lance 132 will tend to cause the metal to rise through the tube 130 into the slag to provide good heat transfer. The gases will tend to bubble up through the slag for agitation. The best heat transfer region is indicated generally at 136. The gas bubbling through the slag is indicated at 137 and this will generate circulation within the slag which will enhance heat transfer to the metal in channel 125. The heat can be added to the slag in a manner that is known and explained in the first forms of the invention.

A transverse sectional view of a heating chamber similar to FIG. 4 is shown in FIG. 6. The channel 152 corresponding to channel 103 extends around the center boss 101 and an inlet tube 161 and recirculation tube 165 are diametrically opposed so that the liquid metal divides and flows essentially equally around the two halves of the channel. The recirculation tube 165 provides recirculation flow in the same manner as previously explained. Metal product can be removed through a weir indicated at 170, and the slag level of course can be controlled by a weir located at any desired location.

Schematically indicated in FIG. 6 are the zones C in the channel 152 in which the heat transfer between the slag and the metal is enhanced by the injection of inert gas into the metal either directly or augmented by the lift tube system indicated in FIG. 5. Also shown in FIG. 6 at D are the slag heating zones where heat is added via the submerged combustion lances. The arrangement of heating lances and mixing lances is such that the combustion gases do not come into contact with the molten metal in the agitated heat transfer zones. The number of inert gas lances and submerged combustion lances may be chosen to optimize the heat transfer function.

The lances are also shown in FIG. 4 with the positioning of the mixing gas lance 114 in the metal layer, and the combustion lances 113 in the slag layer.

The combination of vertical mixing and horizontal net flow of the molten metal in the channel 152 is such that stagnant circulation patterns are avoided.

The combustion fuels, the feedstock, and the lance adjustment devices explained in connection with FIGS. 2 and 3 can be used in the other forms of the invention.

In the process for the direct smelting of ores a separation of three principal functions, smelting, carburization and heating is achieved by providing means for performing each of these functions in a process in which at least the heating function is carried out separately. Fine iron bearing feedstocks are contacted with a carburized molten metal medium of sufficient energy content in order to smelt and reduce the feedstocks. Fine carbonaceous materials are contacted with a molten metal medium of sufficient energy content in order to carburize the molten metal medium while simultaneously undergoing complete devolatilization. Gaseous fuels are combusted within a substantial slag layer overlaying the molten metal in the remote heating chamber in order to obtain efficient heat transfer from the combusted gases into the slag layer and subsequently to obtain efficient heat transfer from the slag layer to the underlying molten metal. The process includes circulation of the molten metal to perform the smelting (smelting reduction), carburization and heating functions sequentially.

In a small scale commercial operation with a nominal 20 ton/hour throughput, the smelting chamber will generate a gas volume of approximately 1550 $Nm^3$/ton of hot metal, using western coal and Minnesota taconite concentrates. Anticipated gas loading is on the order of 60–70 $Nm^3$/min per $m^2$. Using these figures a required surface area of 7.5 to 8.6 $m^2$ will be required for the carburizing/smelting chamber. For the heating chamber of the present invention, a design diameter of six meters is recommended and corresponds to a heat transfer load of 777 $kW/m^2$ over the surface area of 28.3 $m^2$. The total surface area of the system is thus 36.9 $m_2$ and the product capacity is 0.542 tons/hr/$m^2$.

Although the present invention has been described with reference to preferred embodiments, workers skilled in the art will recognize that changes may be made in form and detail without departing from the spirit and scope of the invention.

What is claimed is:

1. A process for smelting iron ores to form carburized metal comprising the steps of providing a quantity of molten metal substantially free of slag;

smelting iron ore by injecting the iron ore into the molten metal in a first chamber;

selectively carburizing the molten metal in said first chamber by adding carbonaceous solids;

circulating molten metal by pumping the metal from the first chamber to a second chamber;

heating the metal in the second chamber connected to the first chamber by combustion while preventing contact of combustion gases with the molten metal; and recirculating a substantial portion of the molten metal to the first chamber through a second conduit, the molten metal circulation being solely through the energy impetus added by the pumping during circulating the molten metal from the first chamber to the second chamber.

2. The process of claim 1 including collection of process gases from the chambers and utilizing such process gases for at least partially adding heat to the metal in the second chamber.

3. The process of claim 1 including the step of establishing a substantial depth of slag on top of the molten metal in the second chamber only, and providing for submerged combustion in the slag layer to permit heat to be transferred from the slag to underlying molten metal.

4. The process of claim 1 wherein said first chamber comprises a chamber for smelting iron ores and for carburization of the molten metal, and the adding of solids comprises adding feedstock materials to the molten metal.

5. The process of claim 1 including discharging at least part of the gases from both chambers for external uses.

6. A process for the direct smelting of ores, comprising the steps of smelting and carburizing in a pool of molten metal which pool is maintained substantially free of slag;

providing a separate heating chamber from the pool formed in the smelting and carburizing step, and heating the molten metal in such separate chamber;

providing a layer of slag on the molten metal in the heating chamber and adding heat from combustion occurring in the slag layer while preventing the combustion gases from contacting the molten metal;

pumping the molten metal from the pool of molten metal formed in the carburizing and smelting steps into the heating chamber;

recirculating a substantial portion of the molten metal from said heating chamber to the pool of molten metal formed in the smelting and carburizing steps; and positioning the heating chamber at a level above the level of the pool formed in the smelting and carburizing steps, and pressurizing the molten metal in the pool formed in the smelting and carburizing steps to maintain a difference in the molten metal level between the heating chamber and the pool formed in the smelting and carburizing steps.

7. The process of claim 6 including adding fine carburization materials to the molten metal to carburize the molten metal while simultaneously undergoing complete devolitalization in the molten metal.

8. The process of claim 6 including the step of pumping liquid molten metal into the heating chamber, in a manner to move the metal at least partially into the slag layer as molten metal exits from the pumping step.

9. The process of claim 6 including the step of providing a heating chamber that has a central raised portion and at least a part annular channel, and adding mixing gas into molten metal in the channel.

10. The process of claim 9 including the step of injection combustible materials through a combustion lance so that the products of combustion discharge into the slag layer.

11. A smelting reactor for forming and processing molten metal comprising a housing having wall means defining a first chamber, and at least a second chamber, said chambers being for containing hot molten metal in at least portions thereof;

means in said first chamber for injecting carbonaceous solids into any liquid metal contained in the chamber;

first conduit means connecting the first chamber and the second chamber, said second chamber having means for adding heat to any molten metal in the second chamber while such molten metal is separated from combustion gases;

second conduit means connecting said second chamber and said first chamber for recirculating any molten metal in the chambers; and means for injecting gas generating solids into any molten metal in one of said conduit means including at least one submerged lance confined within a conduit means open to the second chamber to provide a driving impetus to any molten metal in the conduit to move through the conduit means and from the first to the second chamber.

12. The smelting reactor of claim 11 wherein said means for adding heat comprises a submerged combustion means for submerging into a layer of slag on any molten metal in said second chamber.

13. The smelting reactor of claim 12, including means for adding a slag forming component in the first chamber, the means for injecting gases through the submerged lance injecting sufficient gases for maintaining any slag in suspension with any molten metal as the metal is passed to the second chamber, the second chamber comprising a chamber of size to permit the slag to rise to and form an interface between any molten metal in the second chamber and a formed slag layer, such slag conducting heat to such metal at such interface.

14. The smelting reactor of claim 11, and means to separately remove off gases from each of the chambers.

15. The smelting reactor of claim 11 and a gas seal weir means at a desired level in said second chamber.

16. The smelting reactor of claim 11 and means for removing molten metal from said second chamber for further processing apart from the chambers.

17. The smelting reactor of claim 15 and means for maintaining the pressure in the first chamber higher than pressure in the second chamber.

18. A smelting reactor system for forming and processing molten metal comprising means forming a carburizing chamber for carburizing molten metal therein;

a heating chamber;

conduit means connecting said carburizing chamber and said heating chamber, one of said chambers including means for providing a slagging material for placement in suspension in any liquid metal transferred to the heating chamber, said heating chamber being of size to permit separation of slag to form a slag/liquid metal interface on molten metal therein;

means to add heat to said liquid metal in said heating chamber in a manner to prevent contact of combustion gases with the liquid metal;

conduit means connecting the heating chamber with the carburizing chamber to carry recirculated molten metal from the heating chamber to the carburizing chamber;

means for adding iron ore feedstock into the carburizing chamber; and an injection lance in one of the conduit means, said injection lance being for adding gas forming solids to any molten metal in the conduit to add energy for providing circulation of such molten metal in the smelting reactor as driven by the energy provided to the liquid metal through injection of gas generating solids in the conduit means.

19. The smelting reactor of claim 18 and a port defined in said heating chamber to permit removal of a portion of any liquid metal in said heating chamber for further processing.

20. The smelting reactor of claim 18 wherein the carburizing chamber includes injection lances for addition of coal and slagging components to the carburizing chamber.

21. The smelting reactor of claim 18 and a gas seal weir means open to the heating chamber for providing control of the level of slag in said heating chamber and for providing a depth of slag adequate for submerged combustion for adding heat to liquid metal in such heating chamber.

22. The smelting reactor of claim 18 including means for supporting the heating chamber at a level above the carburizing chamber.

* * * * *

UNITED STATES PATENT AND TRADEMARK OFFICE
CERTIFICATE OF CORRECTION

PATENT NO. : 5,069,715

DATED : December 3, 1991

INVENTOR(S) : Kenneth J. Reid

It is certified that error appears in the above-identified patent and that said Letters Patent is hereby corrected as shown below:

Col. 12, line 6, delete "molten".

Col. 12, line 7, before "metal", insert --molten--.

Signed and Sealed this

Sixteenth Day of March, 1993

Attest:

STEPHEN G. KUNIN

Attesting Officer

Acting Commissioner of Patents and Trademarks